United States Patent
Philipp et al.

(10) Patent No.: US 9,600,124 B2
(45) Date of Patent: Mar. 21, 2017

(54) SENSOR AND METHOD OF SENSING

(75) Inventors: Harald Philipp, Hamble (GB); Esat Yilmaz, Chandler's Ford (GB)

(73) Assignee: Atmel Corporation, San Jose, CA (US)

( * ) Notice: Subject to any disclaimer, the term of this patent is extended or adjusted under 35 U.S.C. 154(b) by 1023 days.

(21) Appl. No.: 12/671,501

(22) PCT Filed: Jul. 31, 2008

(86) PCT No.: PCT/GB2008/002613
§ 371 (c)(1),
(2), (4) Date: Apr. 8, 2010

(87) PCT Pub. No.: WO2009/016382
PCT Pub. Date: Feb. 5, 2009

(65) Prior Publication Data
US 2010/0214259 A1 Aug. 26, 2010

Related U.S. Application Data

(60) Provisional application No. 60/953,096, filed on Jul. 31, 2007.

(51) Int. Cl.
*G06F 3/045* (2006.01)
*G06F 3/044* (2006.01)
(Continued)

(52) U.S. Cl.
CPC .......... *G06F 3/044* (2013.01); *G06F 3/0416* (2013.01); *G06F 3/0418* (2013.01); *G09G 3/3611* (2013.01)

(58) Field of Classification Search
CPC ...... G06F 3/044; G06F 3/0416; G06F 3/0418; G09G 3/3611
(Continued)

(56) References Cited

U.S. PATENT DOCUMENTS 5,357,266 A * 10/1994 Tagawa ................ 345/173
5,410,329 A *  4/1995 Tagawa et al. ...... 345/104
(Continued)

FOREIGN PATENT DOCUMENTS

WO    WO 2012/129247    9/2012

OTHER PUBLICATIONS

"International Application Serial No. PCT/GB2008/002613, Search Report mailed Nov. 17, 2009", 3 pages.
(Continued)

*Primary Examiner* — Amr Awad
*Assistant Examiner* — Aaron Midkiff
(74) *Attorney, Agent, or Firm* — Baker Botts L.L.P.

(57) ABSTRACT

A sensor is arranged to determine the presence of an object from a change in a capacitance of a sensing element. The sensor includes a capacitance measurement circuit operable to perform measurement cycles to measure a capacitance of the sensing element, and a controller circuit. The control circuit is operable to detect a periodic noise signal induced on the sensing element, to determine a first part, of a repeating pattern of the periodic noise signal, which causes a change in an amount of charge present on the sensing element, which affects the measurement of the capacitance of the sensing element by the capacitance measurement circuit, to determine a second part of the repeating pattern of the periodic noise signal, which does not cause a change in the amount of charge present on the sensing element, and to control the measurement cycles of the capacitance measurement circuit to perform the measurement cycles during the second part of the periodic noise signal and not to perform the measurement cycles during the first part of the periodic noise signal.

20 Claims, 10 Drawing Sheets

(51) Int. Cl.
*G06F 3/041* (2006.01)
*G09G 3/36* (2006.01)

(58) Field of Classification Search
USPC .................... 178/18.01–19.07; 345/173–178
See application file for complete search history.

(56) References Cited

U.S. PATENT DOCUMENTS

| | | | |
|---|---|---|---|
| 7,643,011 B2 * | 1/2010 | O'Connor et al. | 345/173 |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 2002/0089449 A1 | 7/2002 | Fox | |
| 2003/0122798 A1 | 7/2003 | Shin | |
| 2006/0232567 A1 | 10/2006 | Westerman et al. | |
| 2007/0120831 A1 | 5/2007 | Mahowald et al. | |
| 2007/0262966 A1 * | 11/2007 | Nishimura et al. | 345/173 |
| 2008/0042994 A1 * | 2/2008 | Gillespie et al. | 345/174 |
| 2008/0158183 A1 * | 7/2008 | Hotelling et al. | 345/173 |
| 2008/0309635 A1 | 12/2008 | Matsuo | |
| 2009/0315854 A1 | 12/2009 | Matsuo | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

OTHER PUBLICATIONS

"International Application Serial No. PCT/GB2008/002613, Written Opinion mailed Nov. 17, 2009", 7 pages.
U.S. Appl. No. 61/454,936, filed Mar. 21, 2011, Myers.
U.S. Appl. No. 61/454,950, filed Mar. 21, 2011, Lynch.
U.S. Appl. No. 61/454,894, Mar. 21, 2011, Rothkopf.

* cited by examiner

SENSOR AND METHOD OF SENSING

RELATED APPLICATION

This application is a U.S. National Stage Filing under 35 U.S.C. 371 from International Patent Application Ser. No. PCT/GB2008/002613, filed Jul. 31, 2008, and published on Feb. 5, 2009 as WO 2009/016382 A2 and republished on Feb. 5, 2009 as WO 2009/016382 A3, which claims the benefit of U.S. Provisional Application Ser. No. 60/953,096, filed on Jul. 31, 2007, the contents of which are incorporated herein by reference in their entirety.

FIELD OF THE INVENTION

The present invention relates to sensors and methods for sensing the presence of an object from a change in a capacitance of a sensing element. The present invention also relates to sensors, which include a plurality of keys, which can be arranged in a matrix and can be used to form, for example, a two dimensional touch sensitive user input device.

In some embodiments a touch sensor includes a key comprising a drive plate and a sense plate, in which the key may be driven contemporaneously with charge measurement taking place or a charge signal may be measured after a key is driven during a measurement cycle.

In some embodiments a touch sensor includes a sensing circuit for use in reducing the effects of noise. In some examples the noise may be induced by another component, such as, for example, a liquid crystal display (LCD) screen, when the touch screen is used to form a touch sensitive display screen.

BACKGROUND OF THE INVENTION

There are various forms of touch sensitive controls which use a capacitive sensor to sense the presence of a body such as a user's finger. A touch sensitive capacitive sensor for example is disclosed in WO-97/23738 [1]. The capacitive sensing device disclosed in WO-97/23738 [1] relies on measuring the capacitance of a sensing electrode to a system reference potential (earth). A single coupling plate is provided and disposed to form a touch sensitive switch. The coupling plate is referred to as a key. In accordance with this example, the key is charged using a drive circuit for a drive part of a measurement cycle and then this charge is measured by transferring the induced charge from the key by a charge detection circuit during a measurement part of the cycle. Typically, a burst of measurement cycles are used to generate a plurality of signal sample values. The sensor can detect the presence of an object near the key as a result of a change in an amount of the charge induced onto the key. Effectively, this provides a measure of a change in capacitance of the key as a result of the presence of the body or object. When a pointing object for example a user's finger approaches the sensing electrode (plate), the pointing object appears to be a virtual ground. This serves to increase the measured capacitance of the sensing electrode to ground. Thus an increase in measured capacitance is taken to indicate the presence of a pointing object. The contents of WO-97/23738 [1] and corresponding U.S. Pat. No. 5,730,165 [3] are incorporated herein in their entirety by reference as background material to the invention.

Another form of touch sensitive control is disclosed in WO-00/44018 [2]. In this example a pair of electrodes are provided which act as a key so that the presence of a body such as a user's finger is detected as a result of a change in an amount of charge which is transferred between the two electrodes. With this arrangement, one of the electrodes (labelled X) is driven with a drive circuit and the other of the pair of electrodes (labelled Y) is connected to a charge measurement circuit which detects an amount of charge present on the Y plate when driven by the X plate. As disclosed in WO-00/440018 [2] several pairs of electrodes can be arranged to form a matrix of sensing areas which can provide an efficient implementation of a touch sensitive two-dimensional position sensor. Such two dimensional capacitive transducing (2DCT) sensors are typically used with devices which include touch sensitive screens or touch sensitive keyboards/keypads which are used in for example in consumer electronic devices and domestic appliances.

Example devices use 2DCT sensors in conjunction with an underlying display such as a liquid crystal display (LCD) or a cathode ray tube (CRT). Devices employing 2DCT sensors have become increasingly popular and common not only in conjunction with personal computers but also in all manner of other appliances such as personal digital assistants (PDAs), point of sale (POS) terminals, electronic information and ticketing kiosks, kitchen appliances and the like. 2DCT sensors are frequently preferred to mechanical switches for a number of reasons. For example, 2DCT sensors require no moving parts and so are less prone to wear than their mechanical counterparts. 2DCT sensors can also be made in relatively small sizes so that correspondingly small, and tightly packed keypad arrays can be provided. Furthermore, 2DCT sensors can be provided beneath an environmentally sealed outer surface/cover panel. This makes their use in wet environments or where there is a danger of dirt or fluids entering a device being controlled attractive. In addition, manufactures often prefer to employ interfaces based on 2DCT sensors in their products because such interfaces are often considered by consumers to be more aesthetically pleasing than conventional mechanical input mechanisms (e.g. push-buttons).

Other devices which may incorporate 2DCT sensors include pen-input tablets and encoders used in machinery for feedback control purposes, for example 2DCT sensors are capable of reporting at least a 2-dimensional coordinate, Cartesian or otherwise, related to the location of an object or human body part by means of a capacitance sensing mechanism.

U.S. Patent Application 60/803,510 [4] describes a 2DCT sensor comprising a substrate with a sensing area defined by a pattern of electrodes in which the electrodes are sensed by passive sensing techniques. A capacitance measurement circuit of the type described in the applicant's U.S. Pat. No. 6,288;707 [5] for example as shown in FIG. 5 of U.S. patent application 60/803,510 [4] is coupled to the sensing electrodes for determining a change in capacitance caused by the approach of a user's finger or other object to the sensing electrodes. Further details of sensor circuitry and methods of driving the sensor circuitry are available in U.S. Pat. No. 5,730,165 [3] and U.S. Pat. No. 7,148,704 [6]. However, it has been found that there are some limitations associated with 2DCT sensors which operate on passive sensing techniques. For example, passive 2DCT sensors can be sensitive to external ground loading. Furthermore, electrical noise generated from such LCD screens can interfere with capacitance measurements when a pointing object approaches the screen. Known methods to minimise the effects of noise on capacitive coupling is to incorporate a shielding layer between the LCD screen and a 2DCT sensor to reduce or block the noise induced by the LCD screen. However, such methods increase the size and thickness of a device incorporating a display screen with a 2DCT sensor when it is more fashionable and desirable to produce smaller devices. Furthermore; additional steps are required during manufacture and as a result there is an increased cost due to further components being needed.

European patent EP 1 821 175 [7] discloses a display device with a touch sensor which is arranged so that a two dimensional touch sensor is overlaid upon a display device to form a touch sensitive display screen. The display device uses an LCD arrangement with vertical and horizontal switching of the LCD pixels. The touch sensing circuit includes a current detection circuit, a noise elimination circuit as well as a sampling circuit for each of a plurality of sensors, which are arranged to form the two-dimensional sensor array. The current detection circuit receives a strobe signal, which is generated from the horizontal and vertical switching signals of the LCD screen. The strobe signal is used to trigger a blanking of the current detection circuit during a period in which the horizontal switching voltage signal may affect the measurements performed by the detection circuit.

Generally, a technical problem subsists in the implementation of touch sensors to reduce the effects of noise signals, which may be induced from another source on a sensing element of the touch sensor.

SUMMARY OF INVENTION

According to the present invention there is provided a sensor which is arranged to determine the presence of an object from a change in a capacitance of a sensing element. The sensor comprises a capacitance measurement circuit operable to perform measurement cycles to measure a capacitance of the sensing element, and a controller circuit. The control circuit is operable to detect a periodic noise signal induced on the sensing element, to determine a first part of a repeating pattern of the periodic noise signal, which causes a change in an amount of charge present on the sensing element, which affects the measurement of the capacitance of the sensing element by the capacitance measurement circuit, to determine a second part of the repeating pattern of the periodic noise signal, which does not cause a change in the amount of charge present on the sensing element, and to control the measurement cycles of the capacitance measurement circuit to perform the measurement cycles during the second part of the periodic noise signal and not to perform the measurement cycles during the first part of the periodic noise signal. The sensor is therefore arranged to detect a repeating pattern of the periodic noise signal induced on the key, and to synchronise the generation of a plurality of measurement cycles to reduce the effects of the noise signal on the measurement of the change in the capacitance of the sensing element.

The noise signal can be produced from any source and provided that the noise signal has a repeating waveform, embodiments of the present invention can be used to reduce the affects of the noise signal on the detection of an object proximate a sensing element of a touch sensor. The touch sensor can be any form of touch sensor such as for example, RC time constant, resonant circuits as well as the examples of charging and discharging a key as disclosed in the afore mentioned WO-97/23738 [1], U.S. Pat. No. 5,730,165 [3] and WO-00/44018 [2]. Furthermore, various methods can be used to detect a change in the capacitance of the sensing element.

Other embodiments of the present invention can provide a sensor, which is arranged to determine the presence of an object from a change in a capacitance of a sensing element. The sensing element may be overlaid upon a display screen. The sensor comprises a capacitance measurement circuit operable to measure a capacitance of the sensing element, and a controller circuit operable to control charging cycles of the capacitance measurement circuit, the controller circuit being configured to produce charging cycles at a predetermined time and in synchronous manner with a noise signal.

It has been identified that it is possible to use the noise output generated from a display screen in a positive manner during capacitance measurement (acquisition) cycles of a sensor. In one embodiment, the charge-transfer cycles or 'bursts' may be performed during certain stages of the noise output signal from the display screen, that is at stages where noise does not significantly affect the capacitance measurements performed. As such, the sensor can be arranged to effectively pick up the noise output from a display screen and automatically synchronise the charge-transfer bursts to occur during certain stages of the noise output cycle.

In one example the sensing element includes a key and the controller is operable to control the capacitance measurement circuit to detect a change in the capacitance of the sensing element by generating one or more measurement bursts, each measurement burst providing a plurality of measurement cycles, each measurement cycle including inducing charge onto the key during a charging part of a measurement cycle, measuring an amount of charge induced on the key during a signal measurement part of the measurement cycle, and detecting the presence of the object proximate the key from a change in an amount of charge transferred from the key, thereby to detect a change in the capacitance of the sensing element. The sensor is therefore arranged to detect a repeating pattern of the periodic noise signal induced on the key, during a noise sensing phase, and to synchronise the generation of the plurality of bursts and the measurement cycles within the bursts to reduce the effects of the noise signal on the measurement of the change in the capacitance of the sensing element. The sensor can be used to form a two dimensional touch sensor, which can be overlaid on a liquid crystal display (LCD) screen. As such, the effects of switching noise on the detection of an object, caused by a common voltage signal of the LCD screen can be reduced.

In some embodiments, firmware implemented in a general purpose micro-controller may be used to capture the noise output signal from an LCD screen and to control the operation of the charge-transfer cycles in relation to predetermined parts of the noise signal. A circuit may alternatively or in addition be used to synchronise the charge-transfer bursts with the LCD noise signal.

In some examples the sensor according to an embodiment of the invention may be used with capacitive sensing apparatus and methods described in U.S. Pat. No. 6,452,514, which is incorporated herein by reference. In one example, the sensing element may comprise a pattern of electrodes. The electrodes can be made of a transparent material, such as indium tin oxide (ITO), Orgacon™ or any other suitable material.

In one example the noise signal is detected from the key itself. For the example of LCD noise which provides a periodic noise pattern, the proximity of the LCD screen with respect to the touch sensor, which may for example form part of a touch sensitive display, will induce a significant noise signal, on the key. By providing an arrangement in which the periodic noise signal can be detected during an initialization phase of the touch sensor, the measurement of capacitively induced charge present on the key, which utilizes a plurality of measurements cycles within bursts, can be synchronised with the noise signal. The synchronisation, can for example therefore avoid rising and falling edges of the periodic noise. As a result, for example, a two dimensional touch sensor can be manufactured and designed separately from the LCD screen with the advantage that physical electrical coupling which would otherwise be required between the touch sensor detection circuit and the LCD screen is not required.

In contrast to what is disclosed in EP 1 821 175 [7] as mentioned above, embodiments of the present invention do not require a noise detector circuit to be connected to address and/or switching signals produced to activate LCD pixels of an LCD screen. Thus, in EP 1 821 175 [7] a connection is required to the common voltage and preferably to the horizontal synchronization signal of the LCD switching circuit to generate a strobe signal which is used to blank out a current signal which is used to the detect the presence and position of an object. In contrast, the present technique can detect the noise signal from the capacitive key itself, thereby providing an arrangement in which the touch sensitive 2DCT sensor is self contained with respect to the LCD screen and the associated driving and control circuit.

Various further aspects and features of the present invention are defined in the appended claims, which include a method of sensing the presence of an object from a change in an amount of charge present on a key, and a controller for controlling a sensing element.

BRIEF DESCRIPTION OF THE DRAWINGS

Example embodiments of the present invention will now be described by way of example only, with reference to the accompanying drawings, in which like parts are referred to by like reference numerals and in which.

DESCRIPTION OF EXAMPLE EMBODIMENTS

Figure 13:
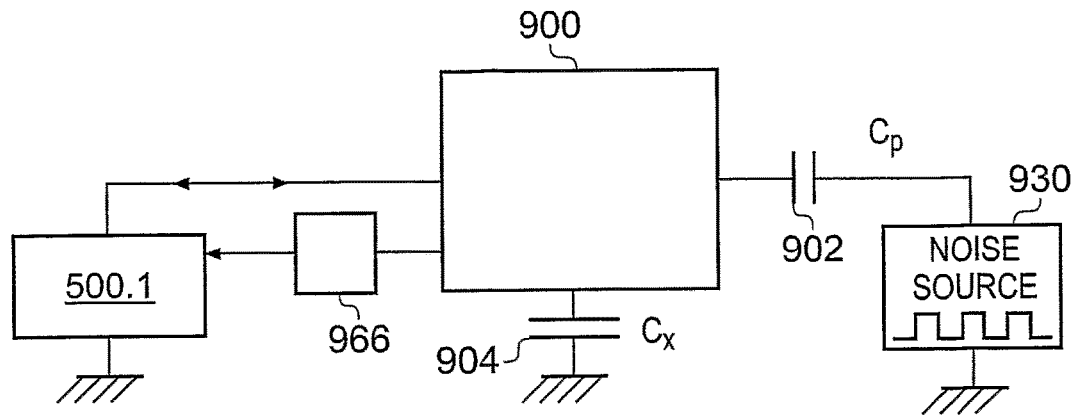
FIG. 13 is a circuit diagram of a further example touch sensor, which utilises a single-ended charging and discharging of a sensing element adapted in accordance with an embodiment of the present invention.
Figure 14:
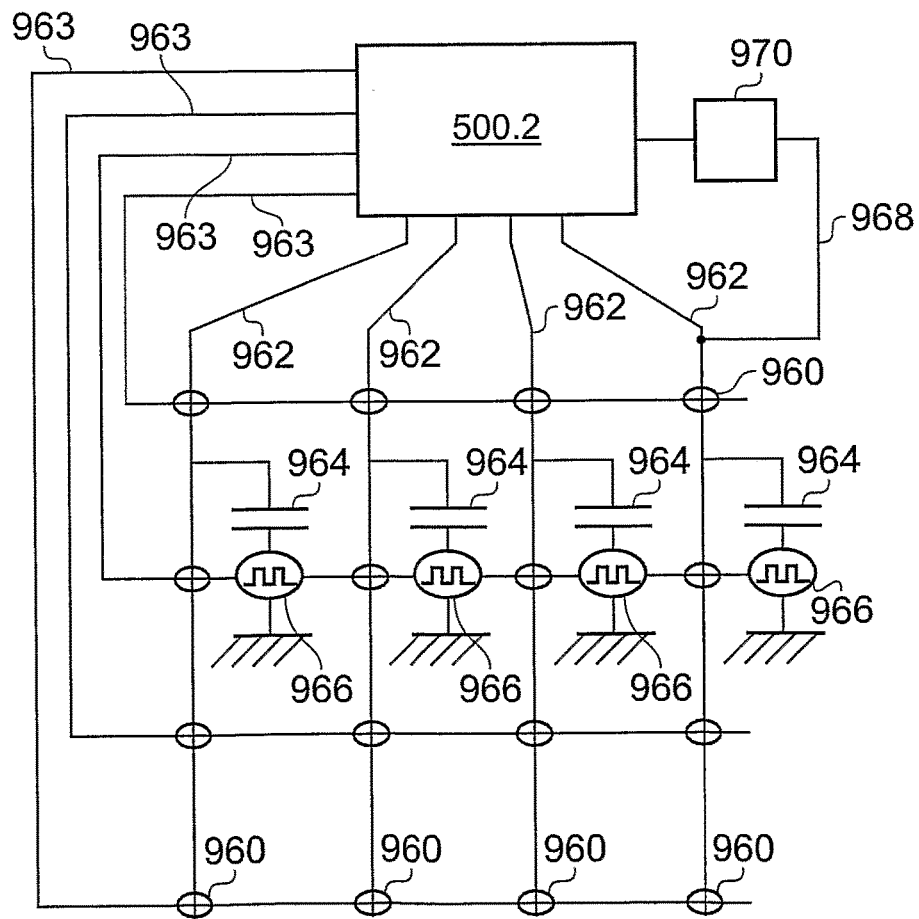
FIG. 14 is a circuit diagram of a further example of a touch sensor, of the single-ended sensing type shown in FIG. 13, which is used to form a two dimensional touch sensor adapted in accordance with an embodiment of the present invention.

As explained above there are various forms of touch sensors which can determine the presence of a body proximate a sensing element of the touch sensor as a result of a change of charge transferred from a key of the touch sensor. The following description with reference to FIGS. 1 to 4 provides a background explanation of the operation of touch sensors according to a first example and FIGS. 13 and 14 provide other example touch sensors with which embodiments of the present invention find application.

Figure 1A:
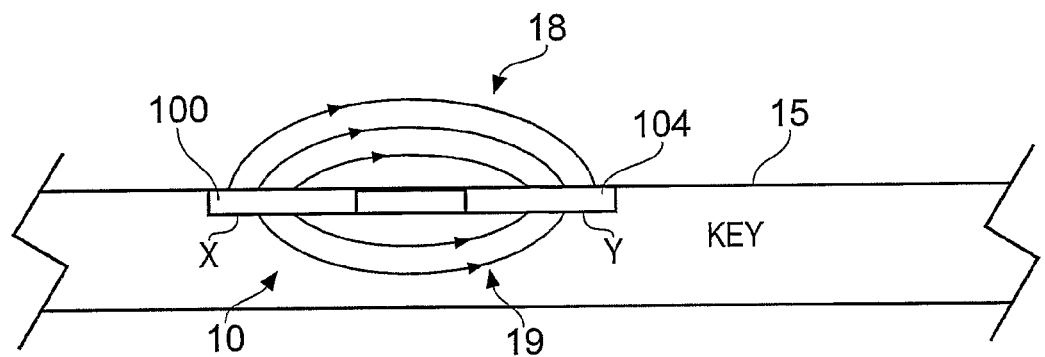
FIG. 1a is a schematic block diagram providing an example of a touch sensitive sensor.
Figure 1B:
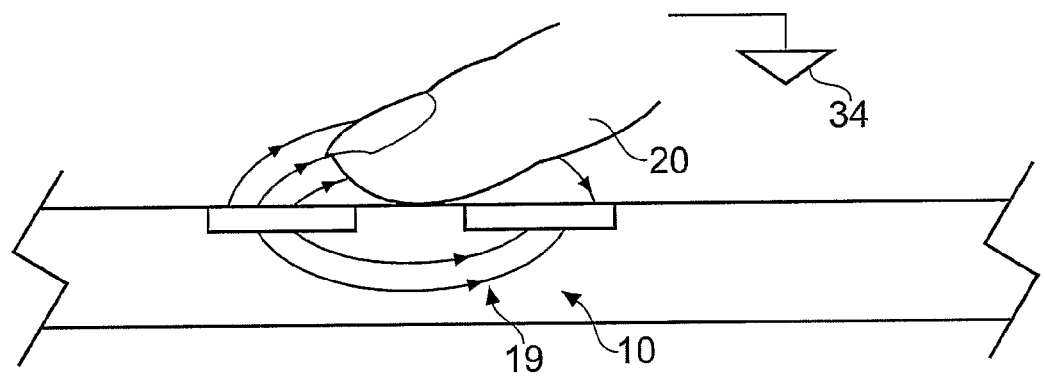
FIG. 1b is an example illustration of a user's finger disposed proximate the sensor.

An example of such a touch sensor is shown in FIG. 1a and 1b. The example shown in FIGS. 1a and 1b correspond to an example in which a pair of transverse electrodes form a touch sensor. As shown in FIG. 1a a pair of electrodes 100, 104 which form a drive or X plate and a receiving or Y plate in the following description are disposed beneath the surface of a touch sensitive control panel 15. As shown in FIG. 1a and 1b the touch sensor 10 is arranged to detect the presence of a body such as a user's finger 20 as a result of a change in an amount of charge transferred from the Y plate 104. As shown in FIG. 1a when the X plate 100 is charged or driven by a circuit, an electric field is formed which is illustrated by the lines 18 and 19 both above and below the touch panel surface 15 as a result of which charge is transferred to the Y plate 104. The X plate and the Y plate 100, 104 form a capacitively charged key 10. As shown in FIG. 1b as a result of the disturbance of the electric field 18 due to the presence of the user's finger 20 the electric field above the surface of the control panel 15 is disturbed as a result of an earthing or grounding effect provided by the user's finger 20 as illustrated schematically by ground 34.

Figure 2:
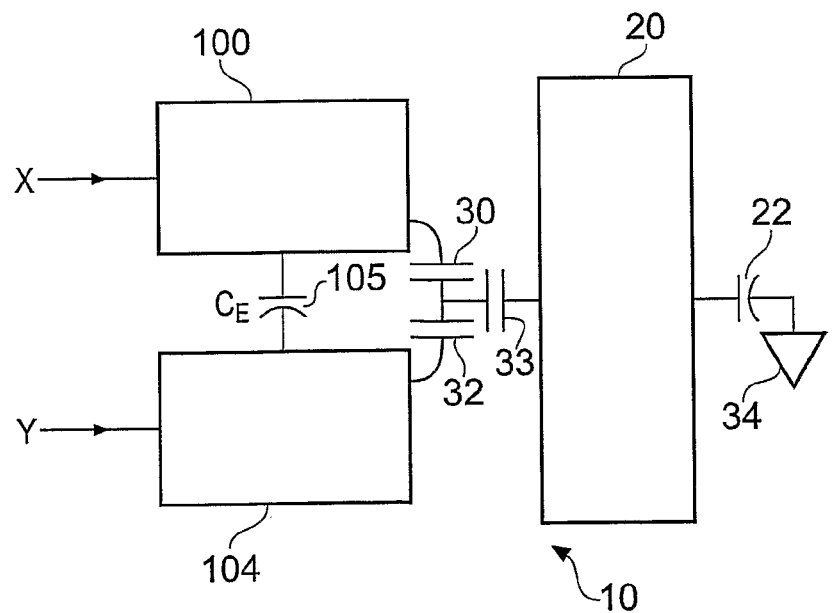
FIG. 2 is a schematic block diagram illustrating an electrical equivalent of the touch sensor shown in FIG. 1b.

An equivalent circuit diagram of the touch sensor shown in FIGS. 1a and 1b is shown in FIG. 2. In FIG. 2 equivalent capacitances are illustrated in the form of a circuit diagram. A capacitance formed between the X plate 100 and the Y plate 104 of the key is a capacitance $C_E$ 105. The presence of the body 20 has an effect of introducing shunting capacitances 30, 32, 33 which are then grounded via the body 20 by an equivalent grounding capacitor 22 to the ground 34. Thus the presence of the body 20 affects the amount of charge transferred from the Y plate of the key and therefore provides a way of detecting the presence of the body 20. This is because the capacitance between the X plate 100 and the Y plate 104 of the key $C_E$ 105 reduces as the grounding capacitances 22, 30, 32, 33 increases.

Figure 3:
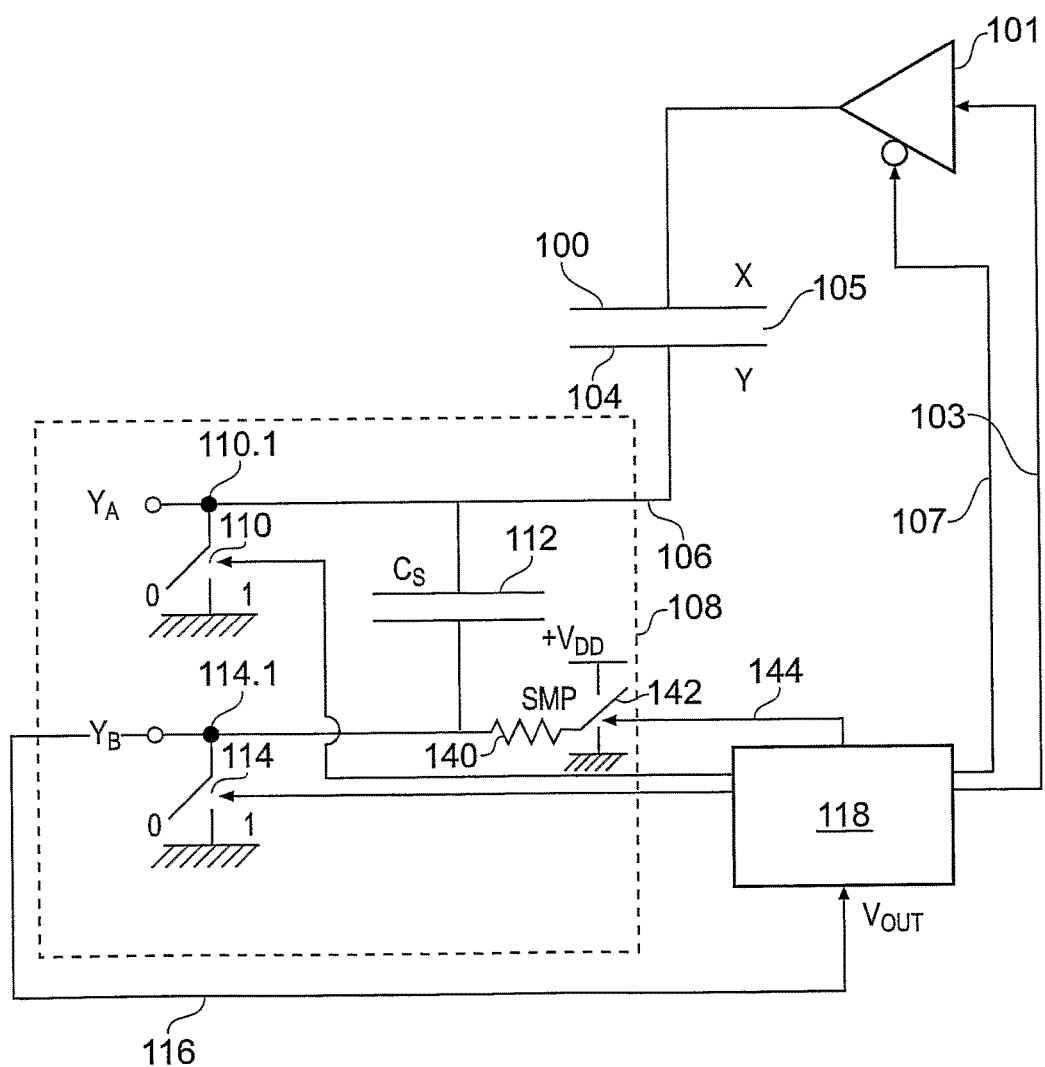
FIG. 3 is a schematic block diagram of a circuit which in combination with the touch sensor shown in FIG. 1b serves to form a touch sensor.

FIG. 3 provides an example circuit diagram, which forms a touch sensor by sensing an amount of charge transferred from the X plate 100 shown in FIG. 2 to the Y plate 104 and includes a charge measurement circuit which has been reproduced from WO-00/44018 [2], which corresponds to U.S. Pat. No. 6,452,514 [8].

As shown in FIG. 3 a drive circuit 101 is connected to the X plate 100 of the key and the Y plate 104 of the key is connected to an input 106 of a charge measurement circuit 108, wherein the X and Y plates collectively form the capacitor 105. The input 106 is connected to a first controllable switch 110 and to one side of a measuring capacitor $C_S$ 112. The other side of the measurement capacitor 112 is connected via a second switch 114 to an output 116 of the measurement circuit 108 which is fed as a voltage $V_{OUT}$ to a controller 118. A first input control channel 103 is used to control the operation of the drive circuit 101, and a second input channel 107 provides an output enable, which can be used to float the output to the X plate 100 of the key 10.

In the circuit diagram shown in FIG. 3 a convention has been adopted to show that a control input of each of the switches 110, 114 is open for the control input "0" and closed for the control input "1". The other side of each of the switches 110, 114 is connected to ground, so that if the control input is "1" then the connecting input would be connected to ground. The operation of the touch sensor shown in FIG. 3 including the function of the measurement circuit which is arranged to measure an amount of charge transferred from the X plate 100 to the Y plate 104 of the key 105 will now be explained with reference to the timing diagram shown in FIG. 4.

Figure 4:
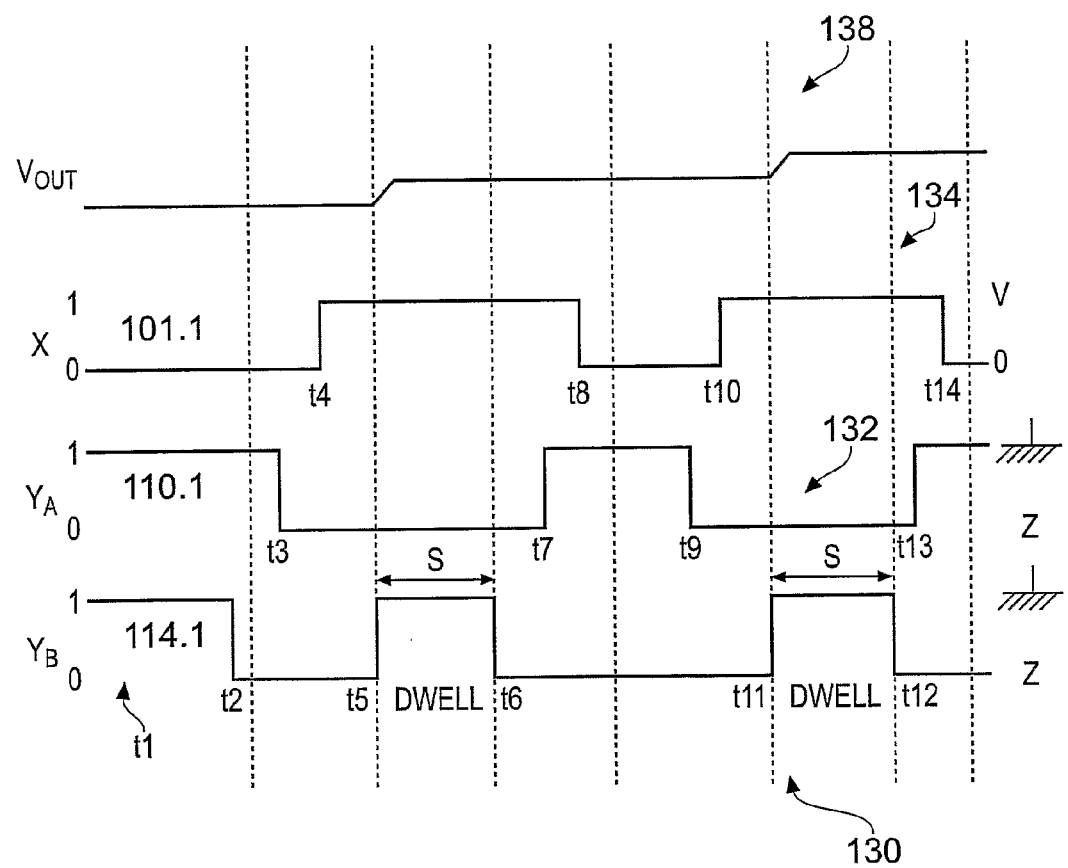
FIG. 4 is an example timing diagram illustrating the operation of the sensing circuit shown, in FIG. 3.

In FIG. 4, four timing diagrams 130, 132, 134, 138 are shown to illustrate the operation of the measurement circuit 108 shown in FIG. 3. A first timing diagram 130 represents the control input applied to the second switch 114. Thus, on the left hand side, the logical value of the control input is shown, whereas on the right hand side the effect at the connecting point 114.1 is shown to be either "Z" in which the connecting point 114.1 is isolated or floating, or for a logical control input of 1 grounded. Similarly a timing diagram 132 illustrates for logical control input values "0" or "1" of a connecting point 110.1 at either floating (Z) or ground (0). A third timing diagram 134 shows a relative timing of a drive signal provided to the X plate 100 of the key in which case, in contrast to the timing diagrams 130, 132 for the two switches 110, 114, the value of the timing diagram is an absolute value so that the left hand side illustrates that the voltage varies between 0V and the reference voltage, which is the voltage used to charge the X plate 100. The final timing diagram 138 provides an illustration of the example signal strength or voltage produced on the measurement capacitor 112 as a result of the opening and closing of the switches 110, 114 and the driving of the X plate 100 in accordance with the timing illustrated by the timing diagrams 130, 132, 134. The timing diagrams 130, 132, 134, 138 will now be explained as follows:

In FIG. 4 at a first point t1, the charge measurement circuit 108 is initialised with both the control inputs for the switches 110, 114 being high (1) so that both the Y plate and the charge measurement capacitor 112 are set to ground and the X plate 100 of the key is at zero and therefore not being driven by the drive circuit 101. Correspondingly, the output voltage across the charge measurement circuit 112 is at zero. At t2 the logical input to the control switch 114 is set to zero thereby opening the switch and floating the connecting point 114.1, which connects the output voltage 116 to one side of the measurement capacitor 112.

At a next time t3 the control input to the switch 110 is set low (0) thereby floating the connecting point 110.1 which is $Y_A$ before at a time t4 the drive circuit 101 drives the X plate of the key 100 to the reference voltage V. Then in order to charge the measurement capacitor $C_S$ for a period S between t5 and t6, the control input to the switch 114 is set high (1) thereby grounding $Y_B$ to transfer charge induced on the Y plate of the key 104 onto the charge measurement capacitor 112, until t6 when the control input to the switch 114 is set to low (0), which again floats the connecting point 114.1. After charging the measurement capacitor $C_S$ for a first dwell time between t5 and t6, at t7 the control input to switch 110 is set high (1), thereby grounding the connecting point 110.1, which is connected to the other side of the charge measurement capacitor $C_S$ 112. As a result, the voltage across the measurement capacitor can be measured. The amount of charge-transferred from the Y plate 104 onto the measurement capacitor $C_S$ 112 during the dwell time between t5 and t6 is represented as the output, voltage $V_{OUT}$.

At t8 the drive circuit 101 goes low (0), which concludes a first measurement cycle.

At t9 the next measurement cycle of a measurement burst occurs. At t9 the control input to the switch 110 goes low (0) thereby floating $Y_A$, before the drive circuit again drives the X plate 100 with a voltage "V", at time t 10. The measurement capacitor 112 is again charged from charge transferred from the Y plate 104 of the key onto the measurement capacitor 112. As with the first burst at point t11 the control input to the switch 114 goes high (1) thereby grounding the point 114.1 and driving charge onto the measurement capacitor until t12, when the control input to the switch 114 goes low, again floating $Y_B$. Thus again charge is transferred from the Y plate 104 during the dwell period between t11 and t12, thereby increasing the voltage across the measurement capacitor $C_S$ as represented as the output voltage $Y_{OUT}$. At t13 the control input to the switch 110 is set high (1) thereby grounding $Y_A$ and at t14 the drive circuit 101 goes low (0), which concludes the second measurement cycle. Thus, as with the first measurement cycle an amount of charge has been transferred from the Y plate, which has then increased the voltage across the measurement capacitor 112, which represents an amount of charge transferred from the Y plate.

After several measurement cycles of a burst, the amount of charge present on the Y plate transferred to the measurement capacitor 112 is consistent, thereby providing a representation of charge present on the key produced by the drive signal to the X plate 100 via the drive circuit 101. The amount of charge on the measurement capacitor 112 is determined with the aide of a discharge resistor 140. One side of the discharge resistor 140 is connected to the measurement capacitor and the other side SMP is connected to a discharge switch 142. The discharge switch 142 receives a control signal from the controller 118 via a control channel 144. The controller 118 is controlled so as to ground SMP, during measurement cycles and to discharge the measurement capacitor $C_S$ 112 through the discharge resistor 140 by connecting SMP to a voltage $V_{DD}$. The controller 118 then determines an amount of charge present by counting a number of predetermined clock periods before the charge on the measurement capacitor $C_S$ is discharged to zero. The number of clock periods therefore provides a relative signal sample value for the respective measured charge signal.

In alternative embodiments, instead of arranging for the controller 118 to generate a predetermined number of measurement cycles and then measuring the charge present on the Y plate, the controller may operate to continue with the measurement bursts until a predetermined threshold voltage is reached. The number of measurement cycles or bursts of cycles which are required to reach the predetermined threshold then provides an indication of the amount of charge transferred from the X plate to the Y plate and therefore an indication of the electric coupling between them. Hence the presence of a body proximate the coupling will change the electric coupling and therefore the number of cycles required to reach the threshold, which can therefore be detected by the controller.

Two Dimensional Touch Sensor Example

Figure 5:
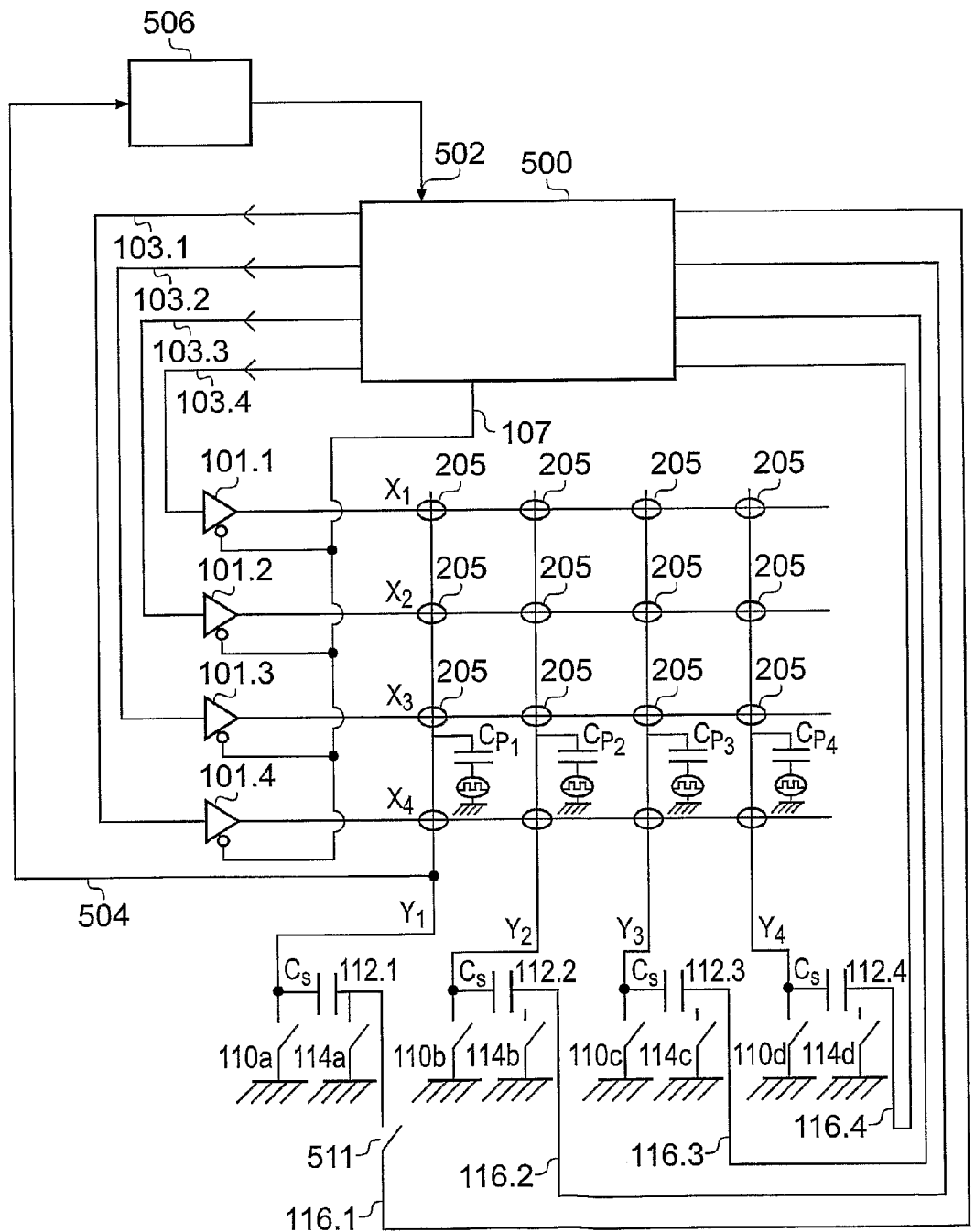
FIG. 5 is a circuit diagram illustrating a touch sensitive matrix providing a two-dimensional capacitive transducing sensor arrangement.

One advantage of the measurement circuit shown in FIG. 3 is that, using the same principles of construction and operation, a matrix of touch sensitive switches can be formed, so that a user can select either a plurality of different positions on a touch sensitive screen, for example, or a plurality of different functions in dependence upon the position of the user's finger for example with respect to the matrix of points. FIG. 5 provides an example of a two dimensional touch sensor, which has been largely reproduced from WO-00/44018 [2], but adapted in accordance with the present technique.

In FIG. 5 drive circuits 101.1, 101.2, 101.3, 101.4 are arranged to drive different sensor points 205 which with example shown in FIG. 5 forms a 4×4 array. Thus, as shown correspondingly in FIG. 6 a control panel with sixteen touch sensitive points is provided which can be used to either form the touch sensitive screen or a control panel with multiple selection control switches. More explanation of FIG. 6 will be provided shortly.

As shown in FIG. 5 each of the drive circuits 101.1, 101.2, 101.3, 101.4 is controlled by a controller 500 to drive each of the corresponding lines X1, X2, X3, X4, using first control inputs 103.1, 103.2, 103.3, 103.4 in the same way as the X plate 101 is driven in FIG. 3 and represented in FIG. 4. Similarly, an output enable control input 107 is provided to float the output of the drive circuits 101.1, 101.2, 101.3, 101.4. The output of the coupling capacitors at each of the points 205 are connected to one side of measuring capacitors Cs 112.1, 112.2, 112.3, 112.4 which are arranged to measure an amount of charge present on the Y plate, Y1, Y2, Y3, Y4 providing output signals 116.1, 116.2, 116.3, 116.4 to detect the presence of an object in the same way as the operation of the circuit shown in FIG. 3 and FIG. 4. This is achieved by applying control signals to the switches 110a, 110b, 110c, 110d, 114a, 114b, 114c, 114d in a corresponding manner to the arrangement explained above with reference to FIGS. 3 and 4. More details for the operation of such a matrix circuit are disclosed in WO-00/44018 [2].

Technical Problem Addressed by Example Embodiments

Although the touch sensor described above with reference to FIGS. 1 to 4 provides an effective touch sensor which can be used for many applications, there is a desire to use such touch sensors in increasingly challenging environments. For example, as explained above, the use of a touch sensor in combination with an LCD screen as shown in FIG. 6 to form a touch sensitive display can have an effect of inducing charge onto the key or keys as a result of switching noise produced by switching LCD pixels within the display on and off, to disrupt the measurement cycles.

It will be appreciated the noise from an LCD screen is one example of a periodic noise signal. Generally, the embodiments of the present invention can be arranged to reduce the effects of noise signals on the measurement of capacitance and therefore touch sensors, by detecting a periodicity of the noise signal and adapting the timing of the capacitance measurement of the sensing element accordingly.

Figure 6:
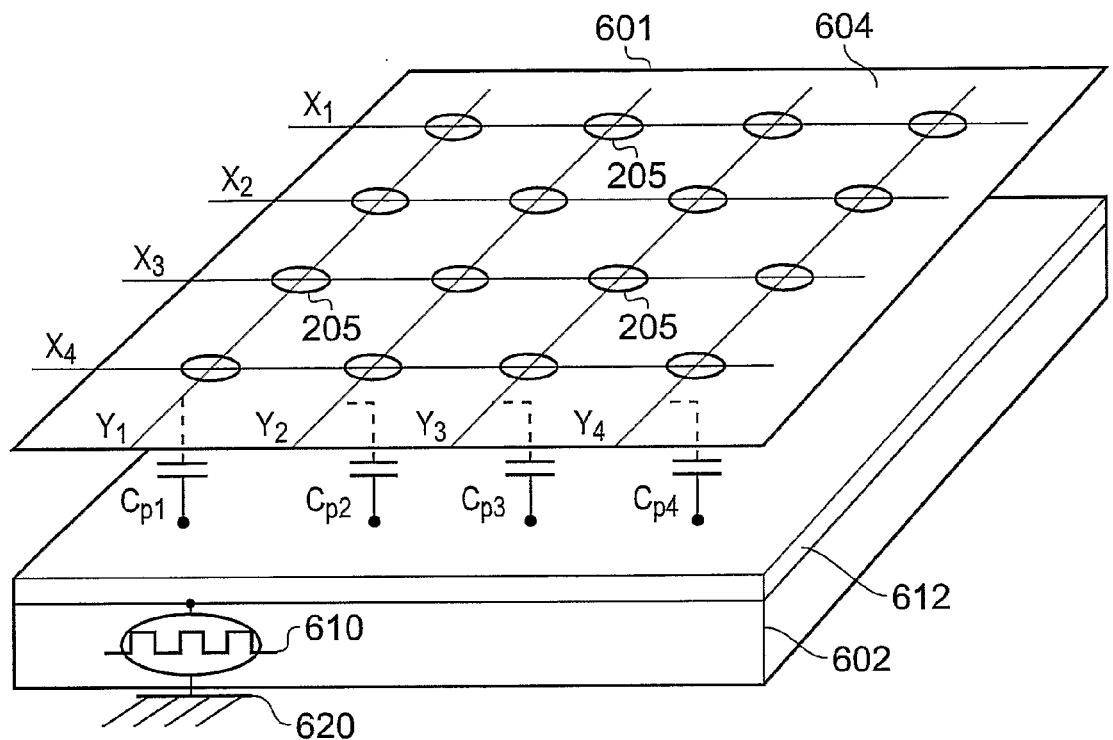
FIG. 6 is a schematic illustration showing an application of the two-dimensional capacitive transducing sensor shown in FIG. 5 with a liquid crystal display (LCD), which in combination form a touch sensitive display screen.

FIG. 6 provides an example illustration in schematic form of a 2D sensor 601, which is shown in the form of a circuit diagram in FIG. 5, disposed above an LCD display screen 602 to form a touch sensitive display. Thus the matrix of capacitive sensors 205 as shown in FIG. 5 are shown to be disposed above an LCD display 602, on a supporting substrate 604.

As with conventional arrangements for implementing an LCD display, a common switching voltage is provided in order to activate the pixels of the LCD screen. The common switching voltage is illustrated schematically as a rectangular wave voltage signal 610 with respect to time with reference to ground 620 and is generated within a field emitting layer 612 of the LCD display screen 602.

As a result of the proximity of the LCD screen to the touch sensor 601 a coupling capacitance $C_{p1}$, $C_{p2}$, $C_{p3}$, $C_{p4}$ between the field emitter 612 of the LCD screen 602 and the sensing outputs Y1, Y2, Y3, Y4 respectively has an effect of inducing the common voltage signal 610 onto the sensing lines Y1, Y2, Y3, Y4 of keys 205 within the 2DCT 601. Schematically, since the amount of charge induced on the keys is detected using the charge measuring circuit, which utilizes the measurement capacitors $C_S$ 112.1, 112.2, 112.3, 112.4, a component of the common voltage will be induced on the sensing outputs Y1, Y2, Y3, Y4 respectively and therefore on the measurement signal detected by the measurement capacitors 112.1, 112.2, 112.3, 112.4. Thus the common voltage of the LCD screen 602 will be detected as a noise signal by the measurement circuits and may produce an erroneous detection of an object when none is present or prevent an object being detected when one is present. Furthermore, the noise signal may affect the detection of a position of an object on the two dimensional touch sensor in that jitter will be introduced into the detected position as a result of the change in charge induced by the noise signal. The jitter in position detection results in the touch sensor detecting an object at different positions even though the object is stationary at a certain position on the touch sensor.

Figure 7:
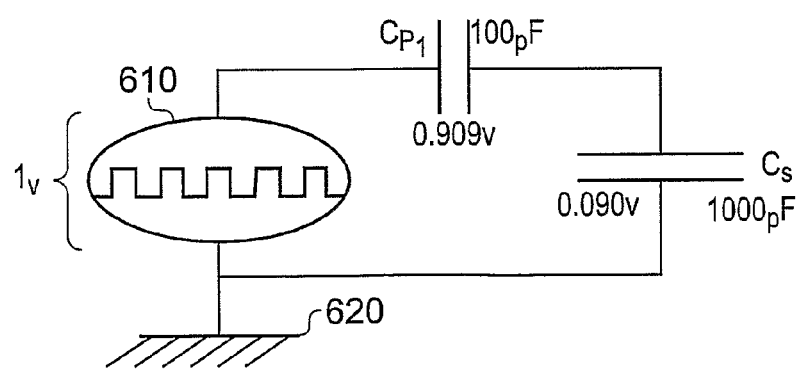
FIG. 7 provides an electrical equivalent circuit diagram of the noise induced by the display screen shown in FIG. 6.

An equivalent electrical circuit diagram illustrating the effect of one of the coupling capacitances $C_{p1}$ shown in FIG. 6 is provided in FIG. 7. The effect of the coupling capacitance $C_{p1}$ is illustrated by assuming that the noise signal caused by the common switching voltage provides a rectangular wave form with an amplitude of 1 volt, the coupling capacitance $C_{p1}$ is 100 picoFarads and the measurement capacitor $C_S$ is 1000 picoFarads. As a result of a potential divider effect provided by the two capacitors $C_{p1}$, $C_S$ the voltage induced by the noise signal across the coupling capacitor $C_{p1}$ will be 0:9090 volts, and across the measuring capacitor $C_S$ will be 0.0909 volts. Thus a significant amount of the noise signal caused by the common switching voltage will be induced across the measuring capacity $C_S$.

Reducing the Effects of Noise Signals

The controller shown in FIG. 5 operates as explained above to detect the presence of an object above one of the matrix of keys 205, from a change in the capacitance of the keys, through a change in an amount of charge induced on the key during a burst of measurement cycles. However, the presence of a noise signal can induce charge onto the keys of a touch sensor and provide a false detection or prevent a detection being made. According to the present technique, the controller 500 is arranged to reduce the effects of the noise signal as explained in the following paragraphs.

The controller 500 is arranged to detect a noise signal induced on one or more of the sensing lines Y1, Y2, Y3, Y4. To this end, one of the sensing lines Y1, Y2, Y3, Y4 is connected to a noise sensing input 502 via a connecting channel 504 which in the example shown in FIG. 5 is the sensing line Y1. Optionally the noise signal induced on the sensing line Y1 may be passed through a signal conditioner 506. In one example the signal conditioner 506 may be a Schmitt trigger.

Figure 8:
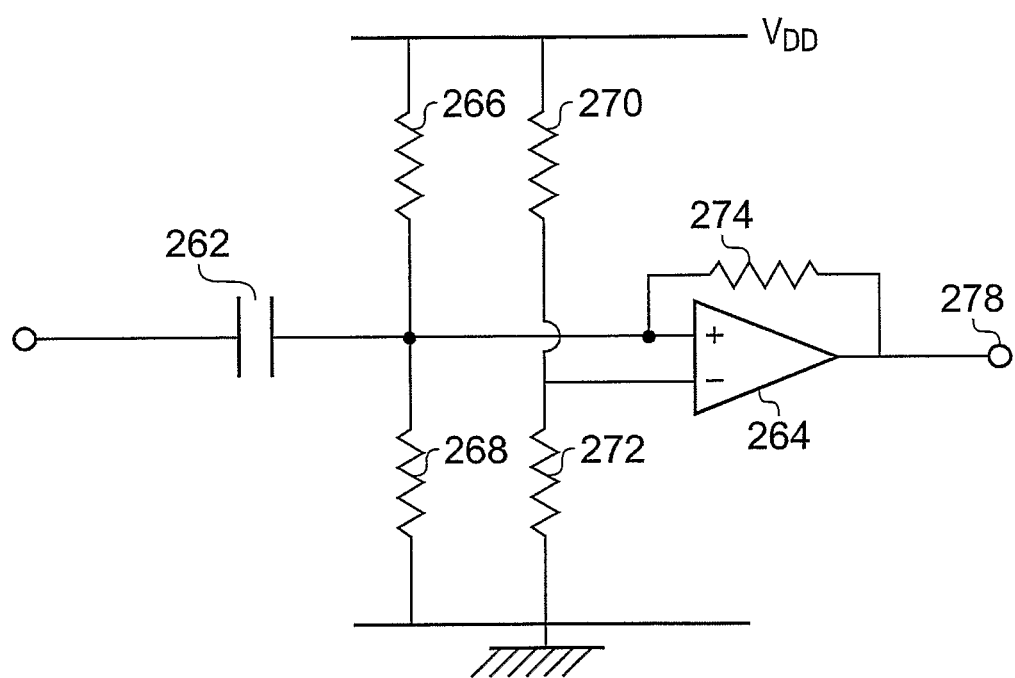
FIG. 8 is an electrical circuit diagram of a sensing signal conditioner shown in FIGS. 5, 13 and 14.

An example illustration of the signal conditioner 506 is shown in FIG. 8, which provides an example in which the signal conditioner is a Schmitt trigger. The noise signal induced on sensing line Y1 of the touch sensor is fed via an optional coupling capacitor 262 to a first positive input of an amplifier 264. The DC voltage at the positive input to the operational amplifier 264 is between a voltage rail $V_{DD}$ and ground between a potential divided by two resistors 266, 268. Correspondingly, the negative input of the operational amplifier 264 is biased between a corresponding potential divider provided by two resistors 270 272. A feed back resistor 274 provides a hysteresis feedback to the operational amplifier 264 which provides a non-linear transfer function, which toggles between 0v and $V_{DD}$, depending on whether the input signal is above or below a value at the negative input of the operational amplifier set by the potential divider resistors 266, 268.

In other examples the noise signal may be sensed from more than one of the sensing lines Y1, Y2, Y3, Y4. However, typically a noise signal with sufficient signal strength can be detected from only one of the sensing lines and therefore only one is used. Furthermore, using more than one version of the noise signal from different sensing output lines would require a summing amplifier to combine these different versions and if signal conditioning is used, a separate signal conditioner per sensing output would be required. This would have the disadvantage of requiring additional expense.

Example Illustrations

Figure 9:
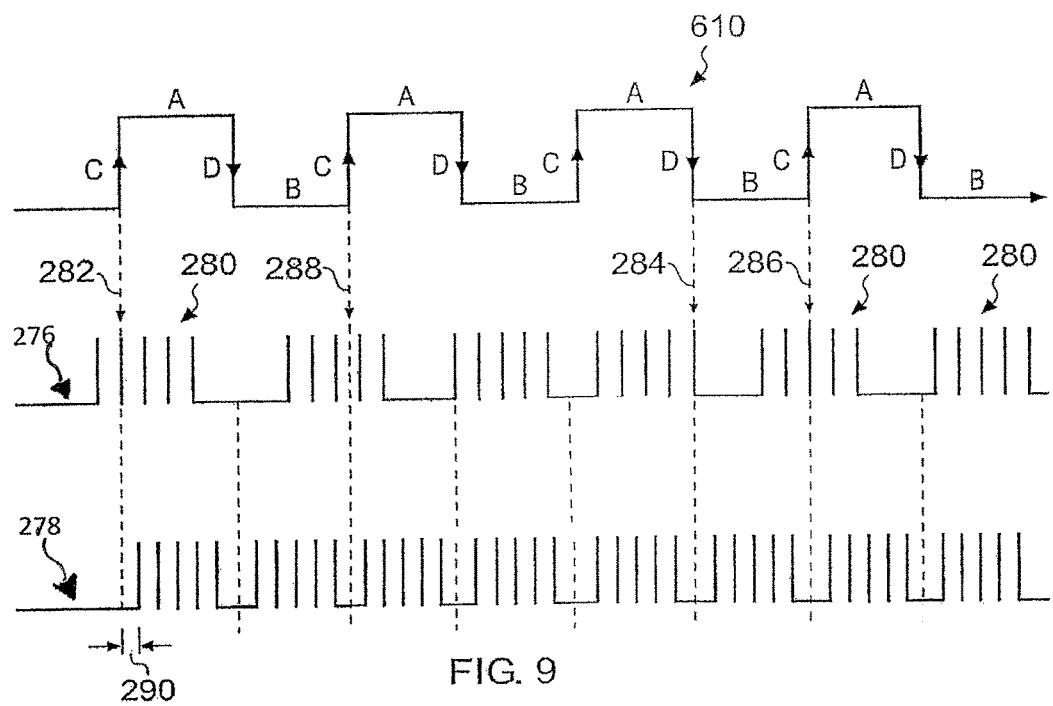
FIG. 9 is a graphical representation of conventional and adapted timing diagrams depicted measurement bursts corresponding to a plot of signal value with respect to time representing a synchronous rectangular noise signal.
Figure 10:
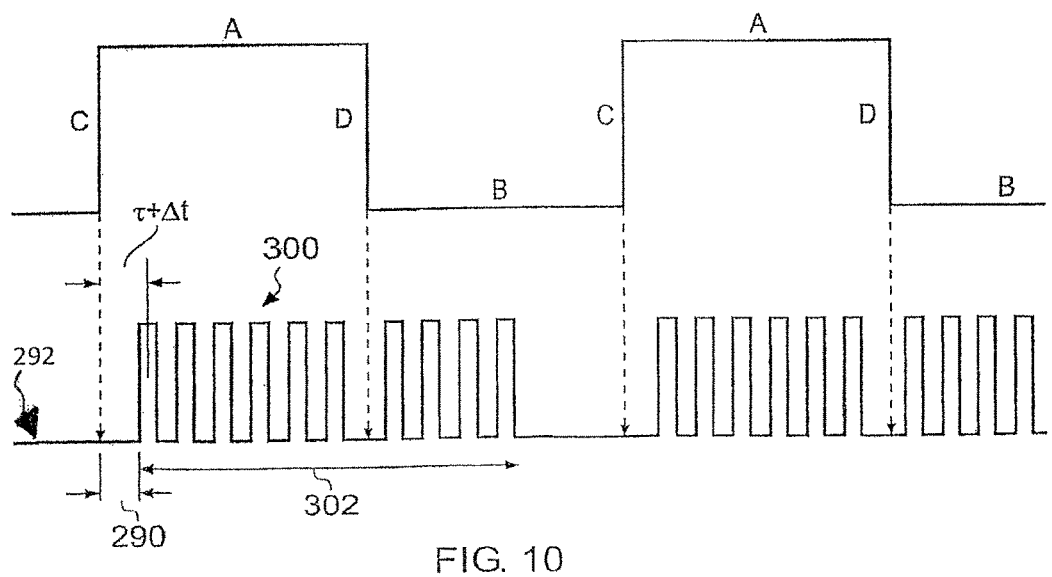
FIG. 10 is a graphical representation of a timing diagram relative to a plot of signal value with respect to time for the periodic noise signal shown in FIG. 9 on an expanded time axis.

The operation of the controller 500 according to the present technique will now be explained with reference to the signal wave form diagrams shown in FIGS. 9 and 10. FIG. 9 provides an example illustration of a common switching voltage 610 produced by the LCD display 602 in order to switch the LCD pixels and as explained above the common voltage signal is induced as noise on the keys of the capacitive matrix of the 2DCT 601. As illustrated in FIG. 9 the common voltage of the LCD screen causes a periodic noise signal having flat portions A, B and rising edges C and falling edges D. The bottom portion of FIG. 9 illustrates a timing diagram 276 depicting a plurality of six measurement bursts each of which provides five measurement cycles in accordance with the technique for inducing and detecting charge present on the keys as explained with reference to FIGS. 1 to 6.

Those acquainted with the technique for measuring charge induced on the capacitively charged key will appreciate that charge is transferred capacitvely as a result of a change in voltage with respect to time; i=Cxdv/dt. Thus, whilst the noise signal has an approximately constant voltage within the flat portions A and B shown in FIG. 9, the measurement cycles in each of the bursts 280 will not be affected by the noise signal. However, with the rising edges C and the falling edges D charge will be induced in the key with the effect that any measurement cycle coinciding with a rising or falling edge C, D will be likely to cause an incorrect measurement in that an object proximate a position on the 2 DCT sensor 601 will either not be detected or an object will be incorrectly detected, whereas in fact none is present. In addition, as indicated above jitter will be introduced into the detection of a position of an object in that a two dimensional sensor may, as a result of the noise signal, detect different positions at different times for a body which is otherwise stationary at a certain position on the touch sensor. Thus, as shown in timing diagram 276 of FIG. 9 those measurement cycles 282, 284, 286 which coincide with either rising or falling edges C, D will produce erroneous results. However, even though the rising edge 288 is at a point in time which is during a measuring burst 280, if the rising edge does not coincide with a measurement cycle then the measurement burst will not be affected by the periodic noise signal, because the rising edge does not coincide with a measurement cycle.

In accordance with the present technique the controller 500 first performs a sensing phase, in which the noise induced on the sensing output lines Y1, Y2, Y3, Y4 is detected. During the sensing phase the drive lines X1, X2, X3, X4 are floated, using the output enable control input 107. Similarly the sensing lines Y1, Y2, Y3, Y4 are floated, by opening the switches 110a, 110b, 110c, 110d, 114a, 114b, 114d. In some examples the output line 116.1 corresponding to the sensing line Y1 on which the noise signal is being detected or all of the output lines 116.1, 116.2, 116.3, 116.4 are also floated by providing a switch either inside the controller 500 or externally, in order to float the line 116.1 or lines 116.1, 116.2, 116.3 116.4. For example, a switch 511 under the control of the controller 500 is provided to float output line 116.1. After floating the drive, sensing and output lines, a period of the periodic noise signal is detected and a timing of the rising and falling edges identified. A temporal region around the rising and falling edges C, D therefore forms a first part of the detected periodic noise signal, which causes charge to be induced, and should be avoided, when attempting to detect an object proximate the touch sensor. A second part of the periodic signal forms a region in which the noise signal does not change significantly, which is the parts A and B in FIG. 9.

The controller 500 is configured to control the generation of the bursts of measurement cycles 280 so as not to coincide with the rising or falling edges of the first part of the periodic noise signal. Thus as illustrated in in timing diagram 278 of FIG. 9, once the rising edges C or falling edges D are detected, then the measurement cycle of the first measurement burst does not begin until a we determined period τ after the rising edge C or falling edge D has been detected. Thereafter, the measurement bursts are generated in synchronism with the periodicity of the noise signal waveform, in a continuous or substantially continuous processes, for example for a predetermined time until a next noise sensing phase. As a result, the 2DCT sensor 601 is not affected by the periodic noise pattern induced by the LCD display, thereby overcoming the disadvantages associated with combining a 2DCT sensor with a LCD display as described above.

In one example, the controller 500 identifies a period of the periodic noise signal by sampling the noise signal, and measuring a length of time between two sample values which are approximately the same, such as where the noise waveform crosses zero. The measurement is repeated for a plurality of different signal sample values, and the average taken as the estimated period of the periodic noise signal. The rising and falling edges of the periodic noise pattern can then be determined by identifying successive samples or groups of samples which change in value by greater than a predetermined threshold within a predetermined time period. The controller 500 can then confirm the detection of the rising or falling edges from a time between successive rising edges or successive falling edges, which should be approximately the same as the determined noise period.

In accordance with the present technique, although the measurement bursts can be arranged to coincide with the flat portions of the periodic noise pattern A, B, it is possible to still utilize as much as possible of the period within which signal measurements of induced charge can be detected. FIG. 10 provides an example illustration of the noise signal in FIG. 9 on an expanding time axis. Timing diagram 292 illustrated in FIG. 10 provides a period of the first of the measurement cycles which extends for a period which is longer than the flat portion A of the noise signal. Thus, as shown in FIG. 10 a first measurement burst 300 occupies a total time period 302. Thus, as explained above after a period τ from which the first rising edge C of the noise signal is detected 290, a measurement burst 300 is undertaken. However, in contrast to the arrangement shown in timing diagram 278 of FIG. 9, in FIG. 10 the period of the burst measurement cycle 302 includes the falling edge D of the noise signal. By arranging the measurement burst 300 to include measurement cycles either side of the falling edge D, the measurement burst can extend into the second flat portion B of the noise signal therefore utilizing more of the time available for detecting a change in the charge induced on the capacitively charged keys. Therefore an increase in the efficiency and responsiveness of the 2DCT can be achieved.

Figure 11:
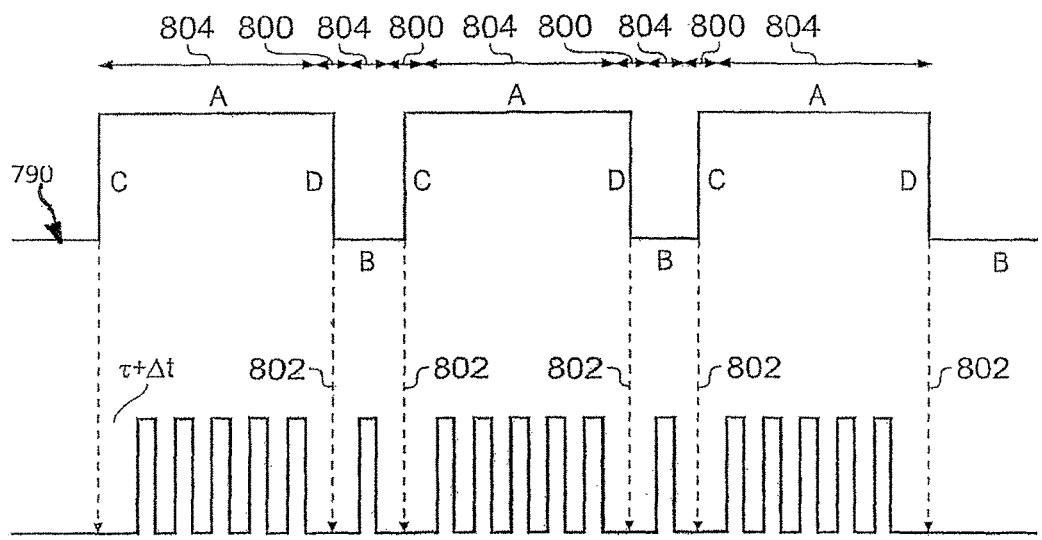
FIG. 11 is a graphical representation of a timing diagram corresponding to a plot of signal value with respect to time for a further example of a periodic noise, signal.
Figure 12:
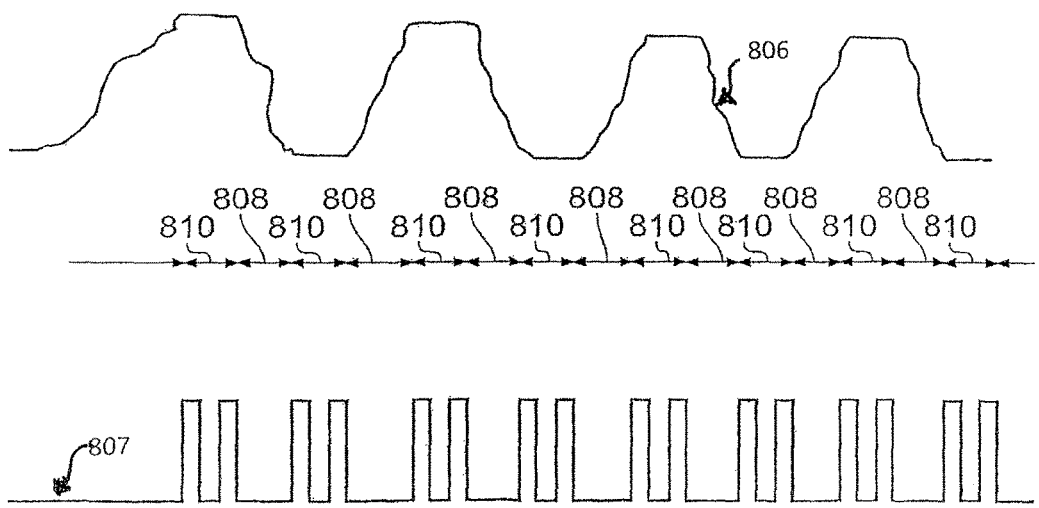
FIG. 12 is a graphical representation of a timing diagram corresponding to a plot of signal value with respect to time for a further example of a periodic noise signal.

Further examples of noise signal waveforms and corresponding control of the measurement cycles by the controller 500 are shown in FIGS. 11 and 12. In FIG. 11 a noise waveform 790 is shown to provide flat parts A, B which are not equal in length. Thus first parts 800 of the periodic waveform 790 which include the rising and falling edges C, D are identified as regions in which measurement cycles should not be performed. Thus as shown in timing diagram 792, although the measurement cycles are generated for a plurality of repeating periods of the periodic waveform measurement cycles are not performed during the first parts 800 as identified by arrows 802. Measurement cycles are performed in second parts, 804, which include the regions A, B, in which the noise signal waveform is substantially constant.

FIG. 12 provides an illustration of timing diagram 807 corresponding to a noise signal waveform 806, which provides a relatively long rise and fall times instead of edges C, D. Thus the first parts 808 of the periodic waveform 806 in which measurement cycles should not be performed are longer than the example shown in FIG. 11, so that the second parts 810 in which measurement cycles can be performed are much shorter.

Although the measurement bursts are shown in FIGS. 9, 10, 11 and 12 to be performed at about the same time with respect to the periodic noise signal, it will be appreciated that there may be some jitter with the effect that the bursts may start at different times with respect to the first part, provided that the measurement bursts are performed in the second part in which the noise signal value is substantially constant.

Other Examples

As explained above, embodiments of the present invention find application with various forms of touch sensor and include touch sensors in which a key is first charged and then discharged such as the example disclosed in U.S. Pat. No. 5,730,165 [3]. In this example, which is illustrated in FIG. 13, a single coupling plate is provided and disposed to form a touch sensitive switch. As for the example explained above, a noise source induces a periodic noise signal on the coupling plate 900, via a naturally formed coupling capacitance 902. A controller 500.1 induces charge onto the coupling plate 900, which forms a key and then measures an amount of charge transferred from the plate 900 to detect a change in capacitance. The change in capacitance may be caused by the presence of a body, which is reflected by a stray capacitance Cx 904. As for the examples explained above, in FIG. 13, the controller 500.1 floats the coupling plate 900 to sense the noise signal induced by the source 930. Optionally a signal conditioner 906 may be used to clean-up the noise signal induced on the plate 900. As for the examples mentioned above, after detecting the noise signal, a period of the noise signal is determined and a first part of the noise signal is identified, in which the noise signal value is changing. The measurement cycles are therefore controlled to avoid the first part of the period and to occur in the second part of the period, in which the noise signal is substantially constant.

Another example of a touch sensor forming a two dimensional array is shown in FIG. 14; which operates in accordance with the same charge transfer technique illustrated in FIG. 13 and explained above. However as shown in FIG. 14 a plurality of keys 960 are coupled to common lines 962, which are controlled by a controller 500.2 to be charged during a drive part of a measurement cycle and discharged by sensing lines 963 in accordance with the technique explained above with reference to FIG. 13. As can be seen, coupling capacitances 964 cause a noise signal 966 to be induced on the lines 962. The noise signal is detected by connecting a line 968 from one of the common lines via an signal conditioner 970 to be received by the controller 500.2.

As will be appreciated from the above explanation, in some embodiments, firmware implemented in a general-purpose micro-controller may be adapted to perform the measurements identified above to capture the noise output signal from a noise source and to control the operation of the charge-transfer and measurement cycles in relation to parts of the noise signal. A circuit may alternatively or in addition be used to synchronise the charge-transfer bursts with the-LCD noise signal.

In some example implementations the sensor according to an embodiment of the present invention may be used with capacitive sensing apparatus and methods described in U.S. Pat. No. 6,452,514 [8], which is incorporated herein by reference. In one example, the sensing element, which forms the key or keys may comprise a pattern of electrodes. The electrodes can be made of a transparent material, such as indium tin oxide (ITO), Orgacon™ any other suitable material. The noise signal may be sensed using the key or matrix of keys themselves or may be sensed from a separate electrode forming part of the touch sensor.

A more detail example of a two dimensional touch sensor is provided in U.S. patent application Ser. No. 11/752,615 [9]. A further example of a touch sensor with which the embodiments of the present invention find application is disclosed in U.S. Pat. No. 6,466,036.

Summary of Operation

Figure 15:
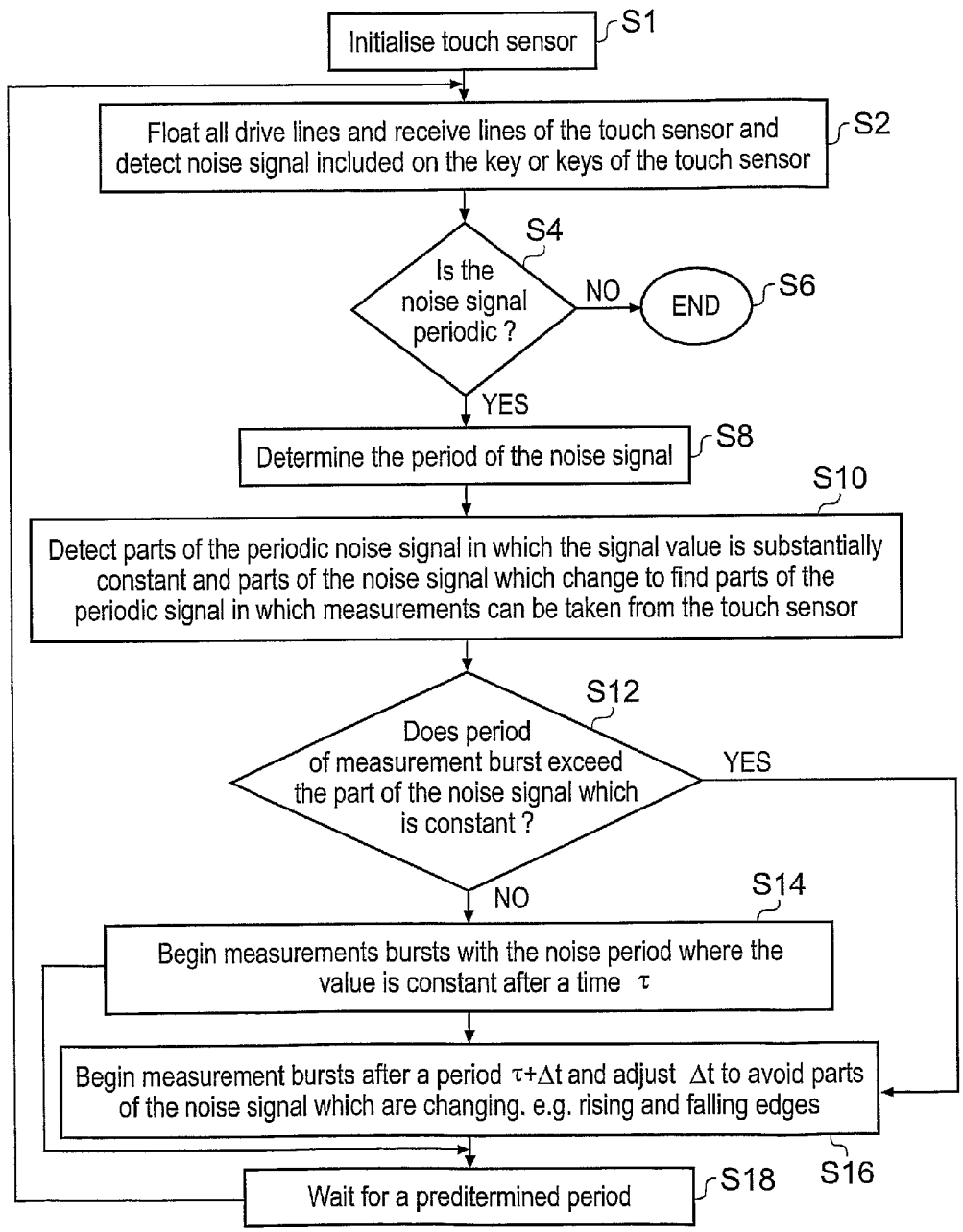
FIG. 15 is a flow diagram representing the operation of a touch sensor according to the present technique.

FIG. 15 provides a summary operation of the controller in accordance with present technique. FIG. 15 is summarized as follows:

S1: After an initial power-on, the controller is initialized to begin operation.

S2: After the initialisation phase, or as part of the initialisation phase, a noise sensing phase is under taken, in which the controller floats the sensing lines and if used any drive lines to receive a noise signal from the key or keys of the touch sensor, which is induced by a noise source. The noise signal is sampled to identify a pattern (step S4, S8), by identifying a consistent temporal separation of noise signal samples, which have the same value (for example zero).

S4: The controller determines whether or not the pattern of the signal is repeating, for example by comparing voltage values of the detected signal, which are the same for a plurality of voltage values and comparing a time at which those values are the same between successive values. For example, a nominal zero crossing point of the noise waveform could be determined for the noise as an ac signal. Thus in step S4, the controller detects whether the noise signal is periodic.

S6: If the noise signal is not periodic then processing ends.

S8: The controller then determines the period of the periodic noise signal, by subtracting two points in time at which the noise waveform value is the same, such as peak values, zero crossing or rising or falling edges after they have been detected.

S10: Within the period of the noise signal, the controller identifies first parts of the periodic signal in which the signal value is changing, such as rising and falling edges. For example, this will be associated with a change between successive samples of the noise signal, which exceeds a pre-determine threshold. Thus second parts of the periodic signal in which the noise signal is approximately constant are also identified.

S12: The controller then determines whether a time period of the second part or parts of the noise signal exceeds a temporal period, which would be occupied by a burst of measurement cycles.

S14: If the measurement burst does not exceed the period of the second part of the noise signal then the controller generates measurement bursts in synchronism with the second part or parts of the noise signal. In particular, after detecting a rising or falling edge of the noise signal the controller waits for a pre-determined period τ from the rising or falling edge and then begins the measurement burst, providing that the total time of the offset τ plus the period of the measurement burst does not exceed a temporal length of the second part of the noise signal (for example the part A of the noise signal in FIG. 9).

S16: If the measurement burst exceeds the temporal length of the second part of the noise signal, then the controller adjusts the timing of the measurement burst to displace the measurement burst with respect to the noise signal, so that after detecting a rising or falling edge a period of τ+Δt is allowed before the measurement burst begins. The value of Δt is adjusted to the effect that the first falling or rising edge after the rising or falling edge which triggers the measurement burst, falls between measurement cycles.

S18: The controller continues to operate in accordance with a conventional operation to detect the presence of an object proximate the touch sensor at a particular location. However, after a pre-determined period the controller re-initializes the touch sensor again by performing the noise sensing phase to detect the presence of a noise signal as summarised above with reference to steps S2 to S16. This is because the noise pattern may have changed since the previous sensing phase.

Further aspects and features of the present invention are defined in the appended claims. Various modifications may be made to the example embodiments described above without departing from the scope of the present invention. In particular, although the above description has been made with reference to a matrix touch sensor which includes a key having an X plate and a Y plate where the X plate is driven and charge is measured on the Y plate, the present invention also finds application where only a single plate is provided in the touch sensor which is first charged in a charge cycle and then discharged in a measurement cycle such as that disclosed in WO-97/23738 [1] or indeed any other technique for detecting the presence of a body through a change in a capacitance of a sensing element.

REFERENCES

[1] WO-97/23738
[2] WO-00/44018
[3] U.S. Pat. No. 5,730,165 corresponds to [1]
[4] U.S. Patent Application 60/803,510
[5] U.S. Pat. No. 6,288,707
[6] U.S. Pat. No. 7,148,704
[7] EP 1 821 175
[8] U.S. Pat. No. 6,452,514
[10] U.S. patent application Ser. No. 11/732,615
[10] U.S. Pat. No. 6,466,036

The invention claimed is:

1. A sensor comprising:
a capacitance measurement circuit operable to perform measurement cycles to measure a capacitance of a sensing element, and
a controller circuit operable to:
analyze a signal used to measure the capacitance of the sensing element to identify a periodic noise signal induced on the sensing element, the periodic noise signal associated with an interference;
determine a first part of the periodic noise signal as being capable of affecting the measurement of the capacitance of the sensing element by the capacitance measurement circuit more than a second part of the periodic noise signal, the interference present during both the first part and the second part of the periodic noise signal; and
control the capacitance measurement circuit to perform the measurement cycles during the second part of the periodic noise signal.

2. The sensor of claim 1, wherein:
the sensing element comprises a key; and
the controller is further operable to control the capacitance measurement circuit to detect a change in the capacitance of the sensing element, the detection comprising:
generating a plurality of the measurement cycles, each measurement cycle comprising inducing charge onto the key during a charging part of the measurement cycle, and measuring an amount of charge induced on the key during a signal measurement part of the measurement cycle; and
detecting an object proximate the key from a change in an amount of charge transferred from the key.

3. The sensor of Claim 1, wherein controlling the capacitance measurement circuit to perform the measurement cycles during the second part of the periodic noise signal comprises:
generating a plurality of measurement bursts, each measurement burst comprising a plurality of the measurement cycles; and
synchronizing the plurality of measurement bursts and the measurement cycles within the plurality of measurement bursts to coincide with the second part of the periodic noise signal.

4. The sensor of claim 3, wherein synchronizing the plurality of measurement bursts and the measurement cycles within the plurality of measurement bursts to coincide with the second part of the periodic noise signal comprises:

determining a temporal length of each of the measurement bursts; and adjusting a timing of the plurality of measurement bursts to coincide with a plurality of parts of the periodic noise signal which are less likely to affect the measurement of the capacitance of the sensing element.

5. The sensor of claim 3, wherein:

determining a first part of the periodic noise signal as being capable of affecting the measurement of the capacitance of the sensing element by the capacitance measurement circuit more than a second part of the periodic noise signal comprises detecting a plurality of rising and falling edges in the periodic noise signal; and synchronizing the plurality of measurement bursts and the measurement cycles within the plurality of measurement bursts to coincide with the second part of the periodic noise signal comprises adjusting a timing of the plurality of measurement bursts to avoid the plurality of rising and falling edges in the periodic noise signal.

6. The sensor of claim 1, wherein the controller circuit is operable to control the capacitance measurement circuit to perform the measurement cycles during the second part of the periodic noise signal. for a plurality of periods of the periodic noise signal.

7. The sensor of claim 1, wherein the controller circuit is operable to identify the periodic noise signal during a noise sensing phase, in which the capacitance measurement circuit does not perform any measurement cycles and the sensing element is floated.

8. The sensor of claim 1, wherein the sensing element comprises a key matrix forming a two dimensional capacitive transducer.

9. The sensor of claim 1, wherein the periodic noise signal is generated by a liquid crystal display screen.

10. A method comprising:

analyzing a signal used to measure a capacitance of a sensing element to identify a periodic noise signal induced on the sensing element, the periodic noise signal associated with an interference;

determining a first part of the periodic noise signal as being capable of causing a greater change in an amount of charge present on the sensing element than a second part of the periodic noise signal, the interference present during both the first part and the second part of the periodic noise signal; and performing measurement cycles to measure the capacitance of the sensing element during the second part of the periodic noise signal.

11. The method of claim 10, wherein:

the sensing element comprises a key; and performing measurement cycles to measure a capacitance of the sensing element during the second part of the periodic noise signal comprises:

generating a plurality of the measurement cycles, each measurement cycle comprising inducing charge onto the key during a charging part of the measurement cycle, and determining an amount of charge induced on the key during a signal measurement part of the measurement cycle; and detecting an object proximate the key from a change in an amount of charge transferred from the key.

12. The method of claim 10, wherein performing measurement cycles to measure a capacitance of the sensing element during the second part of the periodic noise signal comprises:

generating a plurality of measurement bursts, each measurement burst comprising a plurality of the measurement cycles; and synchronizing the plurality of measurement bursts and the measurement cycles within the plurality of measurement bursts to coincide with the second part of the periodic noise signal.

13. The method of claim 12, wherein synchronizing the plurality of measurement bursts and the measurement cycles within the plurality of measurement bursts to coincide with the second part of the periodic noise signal comprises:

determining a temporal length of each of the measurement bursts; and adjusting a timing of the plurality of measurement bursts to coincide with the second part of the periodic noise signal.

14. The method of claim 12, wherein:

determining a first part of the periodic noise signal as being capable of causing a greater change in an amount of charge present on the sensing element than a second part of the periodic noise signal comprises detecting a plurality of rising and falling edges in the periodic noise signal; and synchronizing the plurality of measurement bursts and the measurement cycles within the plurality of measurement bursts to coincide with the second part of the periodic noise signal comprises adjusting a timing of the plurality of measurement bursts to avoid the plurality of rising and falling edges in the periodic noise signal.

15. The method of claim 10, wherein the measurement cycles are performed during the second part of the periodic noise signal for a plurality of periods of the periodic noise signal.

16. The method of claim 10, wherein analyzing the signal present on the sensing element to identify the periodic noise signal induced on the sensing element comprises detecting the periodic noise signal during a noise sensing phase, in which measurement cycles are not performed and the sensing element is floated.

17. The method of claim 16, wherein the sensing element comprises a key matrix forming a two dimensional capacitive transducer.

18. A controller operable to:

analyze a signal used to measure a capacitance of a sensing element to identify a periodic noise signal induced on the sensing element, the periodic noise signal associated with an interference;

determine a first part of the periodic noise signal as being capable of affecting a measurement of the capacitance of the sensing element by a capacitance measurement circuit more than a second part of the periodic noise signal, the capacitance measurement circuit operable to perform measurement cycles to measure the capacitance of the sensing element, the interference present during both the first part and the second part of the periodic noise signal; and control the capacitance measurement circuit to perform the measurement cycles during the second part of the periodic noise signal.

19. The controller of claim 18, wherein:

the sensing element comprises a key; and the controller is further operable to detect a change in the capacitance of the sensing element , the detection comprising:

generating a plurality of the measurement cycles, each measurement cycle comprising inducing charge onto the key during a charging part of the measurement cycle, and measuring an amount of charge induced on the key during a signal measurement part of the measurement cycle; and detecting an object proximate the key from a change in an amount of charge transferred from the key.

20. An apparatus comprising:

means for analyzing a signal used to measure a capacitance of a sensing element to identify a periodic noise signal induced on the sensing element, the periodic noise signal associated with an interference;

means for determining a first part of the periodic noise signal as being capable of causing a greater change in an amount of charge present on the sensing element than a second part of the periodic noise signal, the interference present during both the first part and the second part of the periodic noise signal; and means for performing measurement cycles to measure the capacitance of the sensing element during the second part of the periodic noise signal.

* * * * *

UNITED STATES PATENT AND TRADEMARK OFFICE
CERTIFICATE OF CORRECTION

PATENT NO.         : 9,600,124 B2           Page 1 of 1
APPLICATION NO.    : 12/671501
DATED              : March 21, 2017
INVENTOR(S)        : Philipp et al.

It is certified that error appears in the above-identified patent and that said Letters Patent is hereby corrected as shown below:

In the Claims

Column 17, Line 24: After "noise" and before "for" please delete "signal." and insert -- signal --.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*